Figure 1:
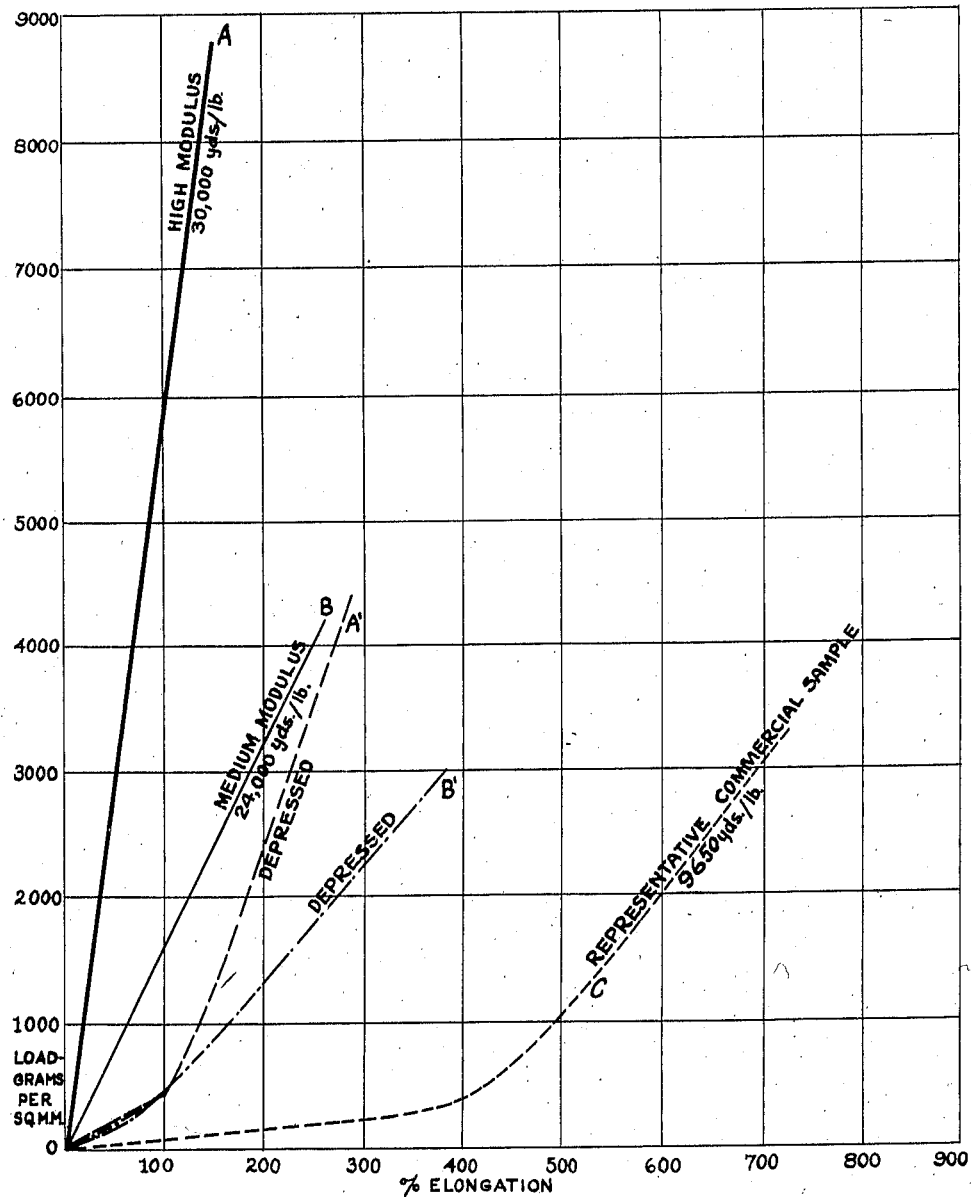

Jan. 11, 1944.   T. L. SHEPHERD   2,338,978
PROCESS OF PRODUCING RUBBER THREADS AND RUBBER FABRIC
Filed Jan. 17, 1941

INVENTOR.
Thomas Lewis Shepherd
BY
ATTORNEYS.

Patented Jan. 11, 1944

2,338,978

UNITED STATES PATENT OFFICE 2,338,978

PROCESS OF PRODUCING RUBBER THREADS AND RUBBER FABRIC

Thomas Lewis Shepherd, Portslade, England, assignor to The Clark Thread Company, Newark, N. J., a corporation of New Jersey Application January 17, 1941, Serial No. 374,852
In Great Britain July 18, 1939

8 Claims. (Cl. 18—54)

This invention relates to improved rubber thread and to the process by which such thread is produced or manufactured.

It is well understood that rubber may be produced by processing a variety of substances either natural or artificial. Accordingly, throughout this specification and claims the term "rubber" shall be understood as generically descriptive or inclusive of rubber obtained from any of such substances and of threads derived from aqueous dispersion of or containing gutta-percha, balata or similar vegetable resins occurring naturally or artificially obtained.

More particularly the invention relates to the manufacture such as by extrusion of threads of rubber of fine count by longitudinally stretching the newly prepared rubber thread to obtain the fine diameter desired.

Hitherto, any attempts that have been made to do this have been characterised in that the internal stresses produced in the rubber thread by stretching, have been eliminated by heating the thread. This can be effected conveniently by using a substantially high temperature of about 100° C. and upwards, such high temperature treatment is usually and conveniently referred to as "annealing."

Heretofore newly prepared rubber threads have been collected under tension on bobbins, drums, cones, cops or other packages with a more or less solid base, preparatory to vulcanizing. Now it has been found that during the period required for vulcanization some relaxation or tightening of the threads on the packages takes place causing a definite deformation of the inner layers of thread, and the larger the package the more deformed do the inner layers become.

Whilst this deformation or unevenness in shape does not in all cases, seriously affect the quality of the thread, deformation is highly undesirable for other reasons. Further, it is found that the degree of vulcanisation varies where the threads are vulcanised in tightly wound and contracting conditions, as when on bobbins, drums, cones, cops or other more or less solid packages, and the modulus also varies in degrees throughout the length of the thread.

It will be readily understood that the layers of thread nearest to the solid base of the package cannot relax whilst those layers further away from the base can, and do, contract and relax in differing degrees as the distance from the base increases.

The outer layers of thread relax and press on the inner layers each layer inwards becoming more tightly pressed. Where packages are wound with a straight traverse the threads sometimes slip into the spaces left by a lower layer and at other points rest immediately above them causing uneven relaxing and deformation, whilst, where a cross wound traverse is used the upper layers press into the lattice formation of the lower layers forming small and ever increasing deformed portions throughout the entire length of the threads which is undesirable, as without special care in the process of manufacturing into fabrics which entails each package being woven or knitted in the exact order that they are taken from the package, all manner of uneven appearance are produced in the fabric.

Recognising that this special care needed is impractical in general production of cloth or fabrics, also that threads must retain a substantially even shape, the present invention in one aspect is concerned with overcoming the above-mentioned difficulties and defects.

Another object of the invention to be hereinafter described is to obtain a rubber thread which can be easily woven, knitted or otherwise manipulated by textile machinery.

Another object of the invention is to obtain a thread which for comparatively small increments of load will give lower increments of extension than are obtainable with elastic thread as hitherto usual or known.

For the purpose of the present invention such thread will be hereinafter referred to as high modulus thread.

Another object of the invention is to render the extension of a stretched rubber thread permanent or partly permanent, without the use of an annealing step or by a process in which an annealing step plays a comparatively small part. By "annealing" is meant the subjugation of the extended or stretched rubber thread to a temperature of approximately 100° C. and upwards while under tension.

Another object of the invention is to produce a rubber thread with a greater resistance to abrasion and chafing during the processes of manipulation in weaving, knitting, or other means of constructing fabrics, also this greater resistance to abrasion is very marked in certain types of wear.

Another object of the invention relates to a rubber thread which has been subjected to a depressing operation. By "depressed" rubber thread is meant a high modulus thread which in suitable manner has had its extensibility somewhat increased in accordance with the invention, such extensibility remains much less than that of known threads.

Various other objects, advantages and characteristics of the invention will become apparent from the following detailed description.

The invention resides in the improved rubber thread, the process and process steps of producing such thread, and in various other features and improvements as hereinafter described and claimed.

Figure 2:
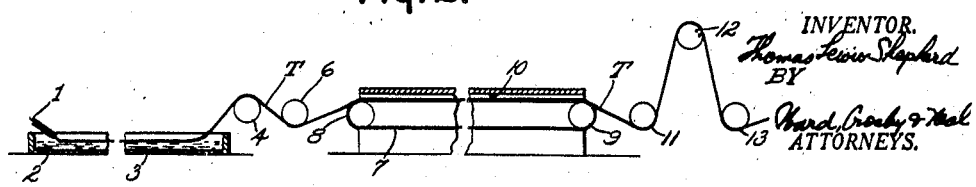

On the accompanying drawing:

Figure 1 illustrates characteristics of selected rubber threads in graph form, and Figure 2 is a diagrammatic representation illustrating apparatus for extruding, precipitating, stretching and drying the rubber thread.

It is known in the art that rubber thread may be produced in various ways. Thus, rubber latex may be extruded through an orifice into a coagulating bath. Or, for example, the thread may be prepared by a printing operation from a grooved roller on a moving blanket or may be produced upon a wire or by means of one or more disks dripping into a bath of latex which is afterwards suitably coagulated, or by the reverse operation in which the dish dips into a bath of coagulant, to which disk latex is subsequently applied. Further, rubber thread may be made by other means, for example, by cutting from sheet rubber, provided that in manufacturing the sheet the "nerve" or natural elasticity of the raw rubber is not wholly destroyed. Such sheet can be made, for example, from latex or by the old-fashioned cut sheet process wherein the degree of mastication is only slight.

In accordance with the invention, rubber thread, whether produced as noted above or otherwise, is stretched or extended longitudinally, dried if necessary, and is then subjected to a suitable vulcanising or equivalent operation below the annealing temperature to produce the improved rubber thread of the invention.

More particularly in accordance with the invention, the rubber thread, for example, may be produced by the extrusion of rubber latex through an orifice into a coagulating bath. Throughout this specification and claims, the term "latex" shall be understood as generically describing or including milky substances from which rubber is derived. Thereafter, to suitable extent, the rubber thread is stretched and dried, the stretching operation being effected before, during, and/or after drying. The drying operation, whether occurring simultaneously with the stretching operation or not, is conducted under such conditions particularly as regards temperature, that annealing is wholly or largely avoided. Thus, the rubber thread may be dried as described above throughout a rather wide temperature range such, for example, as from room temperature ranging upwardly to about 80 degrees C. although as at present preferred, it is desirable for these operations to be affected when the temperature is in the immediate neighbourhood of 65 degrees C.

The high modulus rubber thread is preferably prepared by extruding suitable compounded latex mix into a coagulating bath of aqueous acetic acid, the thread while coagulating being suitably drawn through the bath in such manner that the thread is taken up under slight tension. In accordance with a preferred form of the invention, the rubber thread is stretched to some extent and then passed on to a conveyor belt which carries the thread through a tunnel of warm air while under tension. The thread after leaving the heated tunnel and while still under tension, may be further stretched if desired and then wound on a bobbin. When this is done the take up bobbin or package is preferably reduced in speed in relation to the next previous stretching step, by about 5% so that the thread relaxes slightly, to release any excessive stresses set up by the progressive stretching. Then, immediately the bobbins or packages are removed from the spinning machine the thread is wound to hanks on collapsible swifts, on a reeling machine, lease strings being put into the hanks as is usual with hanks. The hanks are then removed from the collapsible swifts and allowed to hang from suitable pegs or bars free from tension, until vulcanised.

An alternative method of collection at the spinning machine would be to collect on collapsible swifts the thread thus collected being in hank form, the reeling step would be eliminated. The hanks being removed from the collapsible swifts are allowed to hang from suitable pegs or bars free from tension until vulcanised, to produce the high modulus thread of this invention suitable for weaving or otherwise incorporating in a fabric. The compounded ingredients in the latex mix from which the rubber thread is extruded, may be of such a nature that the vulcanisation will take place during storage at ordinary atmospheric temperature. The vulcanising operation may take days or even weeks, depending upon the accelerators and temperature employed.

In accordance with present information, it is believed that this vulcanising temperature should not exceed approximately 50 degrees C., the optimum temperature being in the immediate neighbourhood of 35 degrees C. The lower limit of the vulcanising temperature depends on practical considerations and probably should not be greatly lower than room temperature, for example, 20 degrees C. In order to obtain vulcanisation in a short time at the lower temperature, the latex, before being spun, is compounded with a suitable combination of ultra accelerators and other ingredients in known manner. It will be understood that the vulcanising agents need not necessarily be in the rubber. Thus, the rubber might be suspended in a solution or dispersion of vulcanisers but this is less practical or desirable.

Figure 2 illustrates diagrammatically one of the many forms of suitable apparatus for extruding, precipitating, stretching and drying the thread. This apparatus consists of a nozzle or jet 1 to which the latex is supplied from any suitable source, not shown. The latex thread issues from the nozzle 1 and floats on a coagulating solution 2 contained in a tank 3. As the freshly coagulated thread T leaves the tank 3, it passes upwardly over a roller 4 and then under a roller 6, the thread thereafter passing on to an endless conveyor belt 7, supported and operated by the rollers 8 and 9 disposed, respectively, at the entrance and exit ends of a tunnel 10, the upper span of the conveyor belt 7 moving continuously in a direction from left to right, Figure 2. Beyond the tunnel 10, the rubber thread T may pass under a roller 11, over a roller 12, under a roller 13 and then be wound on to a bobbin, or equivalent, not shown.

In any suitable manner, not shown, the above described rollers are connected together and driven so that the rubber thread T may be stretched and dried in accordance with one preferred form of the invention. Thus, by the interconnected gearing, the roller 4 should be driven at such speed that the freshly coagulated thread passing through the tank 3 is maintained under slight tension. The roller 6 should be rotated at speed somewhat greater than that of the roller 4 so that, in the zone between the rollers 4 and 6, the rubber thread is stretched to some extent. Further, the rollers 8 and 9, which are driven at the same speed, should be rotated at a speed somewhat greater than that of the roller 6 so that, in the zone between the roller 6 and the entrance end of the tunnel 10, the rubber thread will be subjected to further stretching. While on the conveyor belt 7, stretching of the rubber thread does not occur, but, while on said conveyor belt, the rubber thread T, while held stretched, is dried in suitable manner as, for example, by being subjected to an air blast having a temperature ranging preferably between 65 degrees C. and 80 degrees C. Preferably, after leaving the drying tunnel 10 the thread T is passed under roller 11 which is rotated at a greater speed than rollers 8 and 9, thereby stretching the thread further; then over roller 12 which rotates at the same speed as roller 11. From roller 12 the thread passes over a table upon which chalk or any other suitable powder for lubricating the said rubber thread has been deposited; the thread may be guided by an idler grooved roller on to roller 13, the rotation speed of which is slightly reduced say 5% lower than rollers 11 and 12 to allow the thread to relax and release any excess stresses set up in the thread by the stretching processes. If desired, the roller 12 may be driven at a somewhat greater speed than roller 11 so that in the zone between rollers 11 and 12 further stretching of the rubber thread occurs. Roller 13 will then be reduced in speed in relation to roller 12 only. After the rubber thread passes beyond roller 13 it may be wound or collected on bobbins or other suitable carrier; these bobbins being driven by friction collect the thread in its relaxed state and at a speed in F. P. M. (feet per min.) of 5% or other suitable decrease of speed as may be found necessary, to the next previous stretching roller 11 and 12, or 12 only, the thread then being reeled to hank form and subjected to a vulcanizing operation as herein described.

Where the various rollers operate at different speeds as described above, it will be understood that all of them should have substantially the same diameter. However, alternatively, the various rollers may be rotated at constant speed and they may be of progressively increasing diameter so that the thread is stretched and dried in the manner described or otherwise as may be suitable and desirable.

The rubber thread made according to the invention undergoes a small retraction on leaving the bobbins and a further retraction if heated to a substantial extent after vulcanisation, for example, to or beyond an annealing temperature and, preferably, this heating is applied after the thread has been woven into a fabric. This results in the production of rubber thread having depressed curves as shown as A' and B' on the diagram. However, these threads still show an extensibility very much less than that of known rubber threads as represented, for example, by the curve C. In a practical sense the high modulus rubber threads of my invention may be depressed after vulcanisation thereof and as stated preferably, after they have been woven into a fabric by immersing them in hot or boiling water. It has been ascertained that, with an operation of the character just stated, the desired depression is substantially completed after approximately one minute has elapsed although a further slight retraction occurs if the operation is continued ten or fifteen minutes.

In accordance with the invention and as stated above, depression of the rubber threads of the invention, for example, by boiling thereof in water, may be effected on the cloth after the same has been woven from the rubber thread. This results in a cloth having the degree of stretch required.

The invention will now be described by way of certain examples illustrating embodiments thereof. A suitable latex composition is as follows:

| | |
|---|---:|
| Rubber as latex | 100.0 |
| Sulphur | 1.0 |
| Ultra accelerators such, for example, as diethyl ammonium diethyl dithiocarbamate | 0.6 |
| Ultra accelerators such, for example, as sodium isopropyl xanthate | 0.4 |
| Zinc oxide | 1.5 |
| Antioxidant such, for example, as "Nonox" | 1.0 |
| Stabiliser such, for example, as Vulcastab "A" | 1.0 |

In preparing this composition, the various compounding ingredients are added to the latex in the known manner, i. e., after predispersion or solution in water. In connection with this composition, the accelerators should be of the low temperature type and the more active at low temperature the better are the results.

After spinning into 12.5% aqueous acetic acid solution the freshly coagulated thread having a diameter of approximately 0.45 mm. and a count of approximately 3,350 yards per pound is progressively stretched approximately 1000% and dried at a temperature not substantially exceeding 65 degrees C. The dried and stretched thread after passing through some suitable powder such as chalk, is then wound on to bobbins and subsequently into hank form then vulcanised in storage at approximately 20 degrees C. for about three weeks.

Curve A of the accompanying drawing and the following data illustrate the properties of the resulting high modulus thread:

| | |
|---|---:|
| Count_____Yards per lb | 30,000 |
| Tensile strength at break | |
| _____Grams per sq. mm | 8,800 |
| Elongation at break | |
| _____Per cent of original left at rest | 150 |
| Actual load at break_____Grams | 145 |
| Diameter _____mm | 0.15 |

Curve A' and the following data illustrate the properties of the aforesaid high modulus thread after it has been depressed for twenty minutes in boiling water:

| | |
|---|---:|
| Count_____Yards per lb | 21,590 |
| Tensile strength at break | |
| _____Grams per sq. mm | 4,600 |
| Elongation at break | |
| _____Per cent of original left at rest | 290 |
| Actual load at break_____Grams | 106 |
| Diameter _____mm | 0.17 |

By varying the procedure so that the stretching instead of being 1000% is 830%, the temperature of drying 80 degrees C. and the vulcanising being effected in the manner described in the previous example, a medium high modulus thread is produced as illustrated by Curve B and the following data:

| | |
|---|---|
| Count_____Yards per lb__ | 24,000 |
| Tensile strength at break_____ | |
| _____Grams per sq. mm__ | 4,250 |
| Elongation at break_____ | |
| ____Per cent of original length at rest__ | 257 |
| Actual load at break_____Grams__ | 88 |
| Diameter _____mm__ | 0.16 |

Curve B' and the following data illustrate the properties of the aforesaid medium high modulus thread after it has been depressed for twenty minutes in boiling water:

| | |
|---|---|
| Count_____Yards per lb__ | 19,000 |
| Tensile strength at break_____ | |
| _____Grams per sq. mm__ | 3,000 |
| Elongation at break_____ | |
| _____% of original length at rest__ | 375 |
| Actual load at break_____Grams__ | 78 |
| Diameter _____mm__ | 0.18 |

Curve C and the following data illustrate the properties of a typical known prior art rubber thread:

| | |
|---|---|
| Count_____Yards per lb__ | 9,650 |
| Tensile strength at break_____ | |
| _____Grams per sq. mm__ | 3,430 |
| Elongation at break_____ | |
| ____Per cent of original length at rest__ | 715 |
| Actual load at break_____Grams__ | 176 |
| Diameter _____mm__ | 0.26 |

While stretching apparatus of the character hereinbefore referred to, the stretching takes place before and after drying. However, as previously stated, the stretching operation may be effected before, during and/or after drying. When two-stage stretching is practised or disclosed herein, satisfactory results have been obtained when the rubber thread was given approximately one-third of its stretch before entering the drying tunnel and approximately two-thirds after leaving the drying tunnel. It shall be understood, however, that the invention is not to be limited to stretching of the thread in separate stages since either single- or plural-stage stretching may be practised as desired.

In general, the degree or extent of stretching may be such as is suitable and desirable. In accordance with the invention, the degree of extension of the rubber thread covers a range extending from about 400% to about 1800 of the length of the rubber thread as existing at the roller 4, Figure 1, or equivalent drawing member at the discharge end of the coagulating bath. It shall be understood, however, that the invention, in some of its broader aspects is not to be limited to the stretching range just stated.

In general, the time interval of the drying step varies more or less inversely as the temperature of drying. Thus, in the specific example first given, the drying temperature was 65 degrees C. and the drying period is decreased, the period of drying is increased. For example, if the drying temperature is 20 degrees C., the drying period should be 24 hours, more or less.

It has been found that rubber thread made according to the process of this invention is characterised by an unusually high modulus, i. e., a higher load per cross-sectional area at any given extension than is usual or has previously been known. This is illustrated on the diagram in which the thread of this invention as represented by the stress-strain curves A, A' and B, B' is shown in comparison with the known rubber thread as represented by the stress-strain curve C. The group of curves noted immediately above serves to emphasise the high rigidity or stiffness of the thread made according to this invention.

The reduced extensibility of the high modulus thread is of great value in the textile industry as it greatly facilitates the weaving and knitting of the thread which process is well known to those skilled in the art to be a difficult or even impossible operation with bare elastic rubber or even textile covered threads of the known type. This property of high modulus of the thread made according to the invention is also of great importance in woven or knitted goods where a high extensibility is not required although a limited stretch is desirable.

It will be appreciated that the principle of the invention resides in so stretching, drying and vulcanising the thread that the elongation is fixed (or partially fixed) but the thread is not annealed or only partly so. In the specific examples of the invention herein described, it has been shown that it is desirable to carry out the process of stretching, drying and vulcanising the thread at temperatures below the annealing temperature, that is, below about 100 degrees C., the drying being effected preferably at approximately 65 degrees C. and the vulcanisation temperature ranging from 50 degrees C. to 20 degrees C. or at a similar "room" temperature.

In view of the foregoing, it will be understood that when the novel rubber thread of this invention is loaded, the initial increments of elongation are of the same order as the final increments and the type of curve is substantially the same throughout as that produced by a true textile yarn. In other words, the modulus of the stress-strain curve for the rubber thread of this invention is of a very high order. This characteristic of the novel rubber thread renders it possible to weave such rubber thread as a weft thread in an ordinary Lancashire loom.

It will be readily understood that rubber threads made according to this invention may be utilised in association with textile threads, for example creped threads as described in the specification of Patent No. 520,092 or these higher modulus threads may be coated or sized with or without associated textile threads as described in the specification of Patent 423,997, or may be associated with ordinary textile threads to form a composite rubber/textile thread by twisting or doubling the two or more threads as may be desired, by giving from five turns per inch upwards as may be necessary to meet the requirements of different fabrics. This doubling of two or more threads in the composite thread enables it to be used as warp threads without any special arrangement for warp let off at the loom the textile thread preventing the rubber thread from sagging when the "shed" is opened for the passage of the shuttle across the warp. It is also advantageous when used as weft in the thicker wefted fabrics; as when the rubber thread is depressed in the "finishing" treatment given to the fabric it may be found not to equal in thickness the other wefts used.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What I claim is:

1. Process for the production of a rubber thread having a high modulus of elasticity, comprising forming a vulcanizable rubber thread, stretching the formed thread beyond its elastic limit, then vulcanizing the elongated thread at a temperature below its "annealing" temperature and without tension thereon, and subsequently subjecting the vulcanized thread to high temperature treatment to produce a "depressed" high modulus rubber thread.

2. Process of producing fabric including rubber thread, which comprises forming a vulcanizable rubber thread, stretching such thread by at least several hundred percent, thereafter vulcanizing such thread while it is in stretched condition but not held against contraction by any outside force and without subjecting same to a temperature sufficient to "anneal" same to any substantial extent, whereby the thread acquires a high modulus of elasticity, forming a fabric comprised of such high modulus thread, and then subjecting the fabric to an "annealing" temperature to thereby "depress" the modulus of said thread in the fabric.

3. In the process of producing high modulus rubber thread, the steps which consist in stretching by at least several hundred percent and drying a vulcanizable rubber thread, the drying operation being effected at a temperature lower than approximately 80 degrees C. and thereafter vulcanizing the rubber thread while it is in stretched condition but not held against contraction by any outside force and at a temperature lower than approximately 50 degrees C.

4. The process of producing high modulus rubber thread, which comprises forming a vulcanizable rubber thread from a latex composition, stretching beyond the elastic limit and drying the thread, and vulcanizing the thread while in stretched condition but not held against contraction by any outside force, the drying and vulcanizing operations being effected below the annealing temperature.

5. The process of producing high modulus rubber thread, which comprises applying force to a vulcanizable rubber thread to draw it through a coagulating solution, stretching and drying the rubber thread, the degree of stretch imparted to said rubber thread after it has passed through such coagulating solution ranging between approximately 400 per cent. and approximately 1800 per cent., the drying operation being effected at a temperature generally below the annealing temperature, and vulcanizing the thread while in stretched condition but not held against contraction by any outside force, at a temperature lower than approximately 50 degrees C.

6. In the process of producing high modulus rubber thread, the steps which consist in forming a vulcanizable rubber thread from a later composition, stretching the rubber thread to a substantial extent and beyond its elastic limit, drying said thread at a temperature below its annealing temperature, thereafter further stretching the rubber thread beyond its elastic limit, and then vulcanizing the thread at a temperature below its annealing temperature.

7. Process of producing a fabric comprising rubber thread, which comprises vulcanizing the rubber thread after stretching same beyond its elastic limit but while it is not held against contraction by any outside force and at a temperature insufficient to cause annealing of the same to any substantial extent, weaving the rubber thread into a fabric, and subjecting the fabric to an annealing temperature to thereby "depress" the rubber thread in the fabric.

8. Process of producing fabric including rubber thread, which comprises forming a vulcanizable rubber thread, stretching such thread by at least several hundred percent, thereafter vulcanizing such thread while it remains in stretched condition but without tension applied thereto, and at a temperature substantially below its "annealing" temperature, whereby the thread acquires a high modulus of elasticity, forming a fabric comprised of such high modulus thread, and then subjecting the fabric to an "annealing" temperature to thereby "depress" the modulus of said thread in the fabric.

THOMAS LEWIS SHEPHERD.